Jan. 2, 1934.  C. ERSKINE  1,941,669
SEMITRAILER
Filed June 25, 1932   2 Sheets-Sheet 1
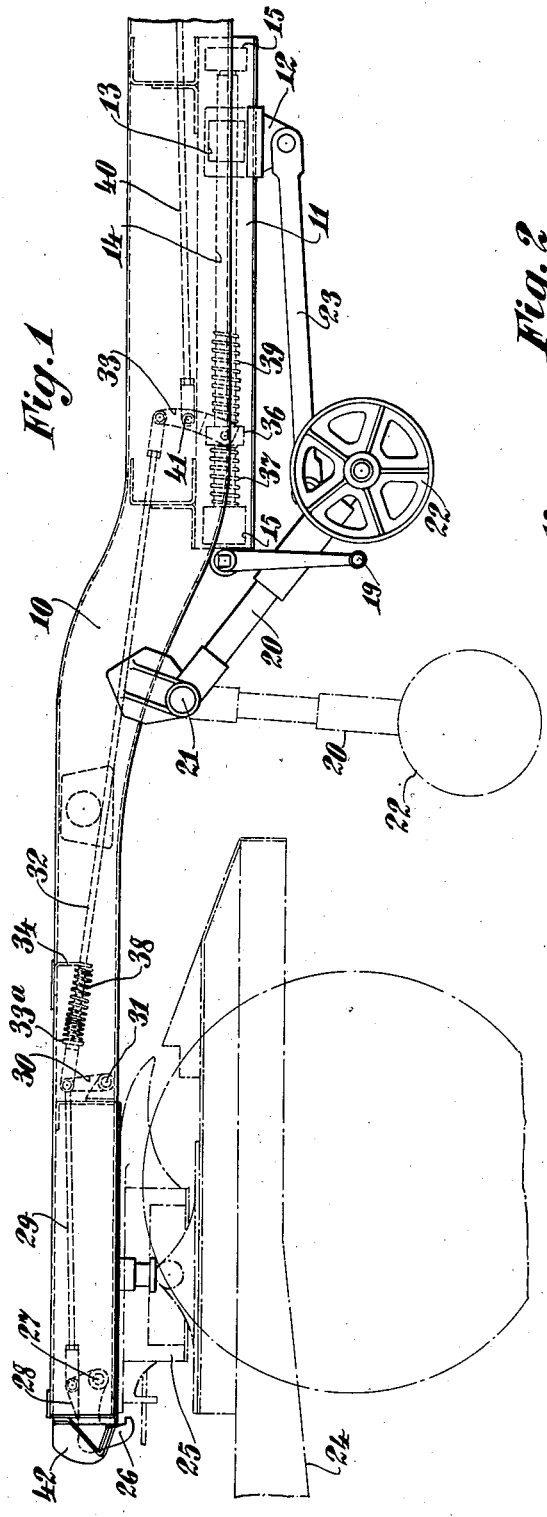
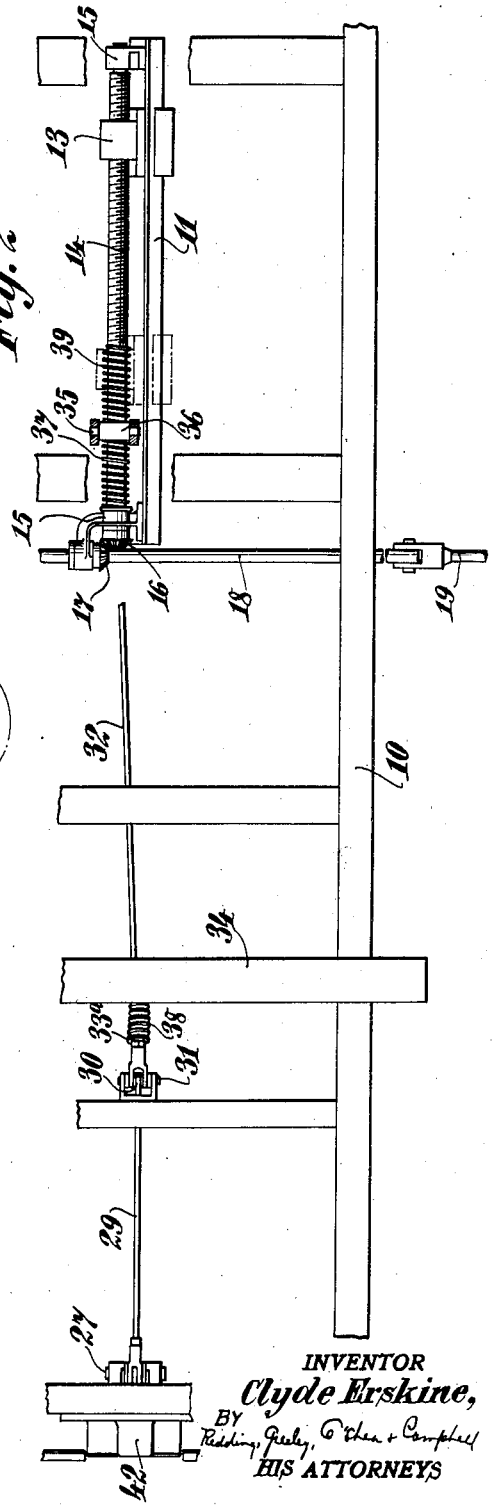
INVENTOR
Clyde Erskine,
BY
HIS ATTORNEYS Jan. 2, 1934.  C. ERSKINE  1,941,669
SEMITRAILER
Filed June 25, 1932  2 Sheets-Sheet 2
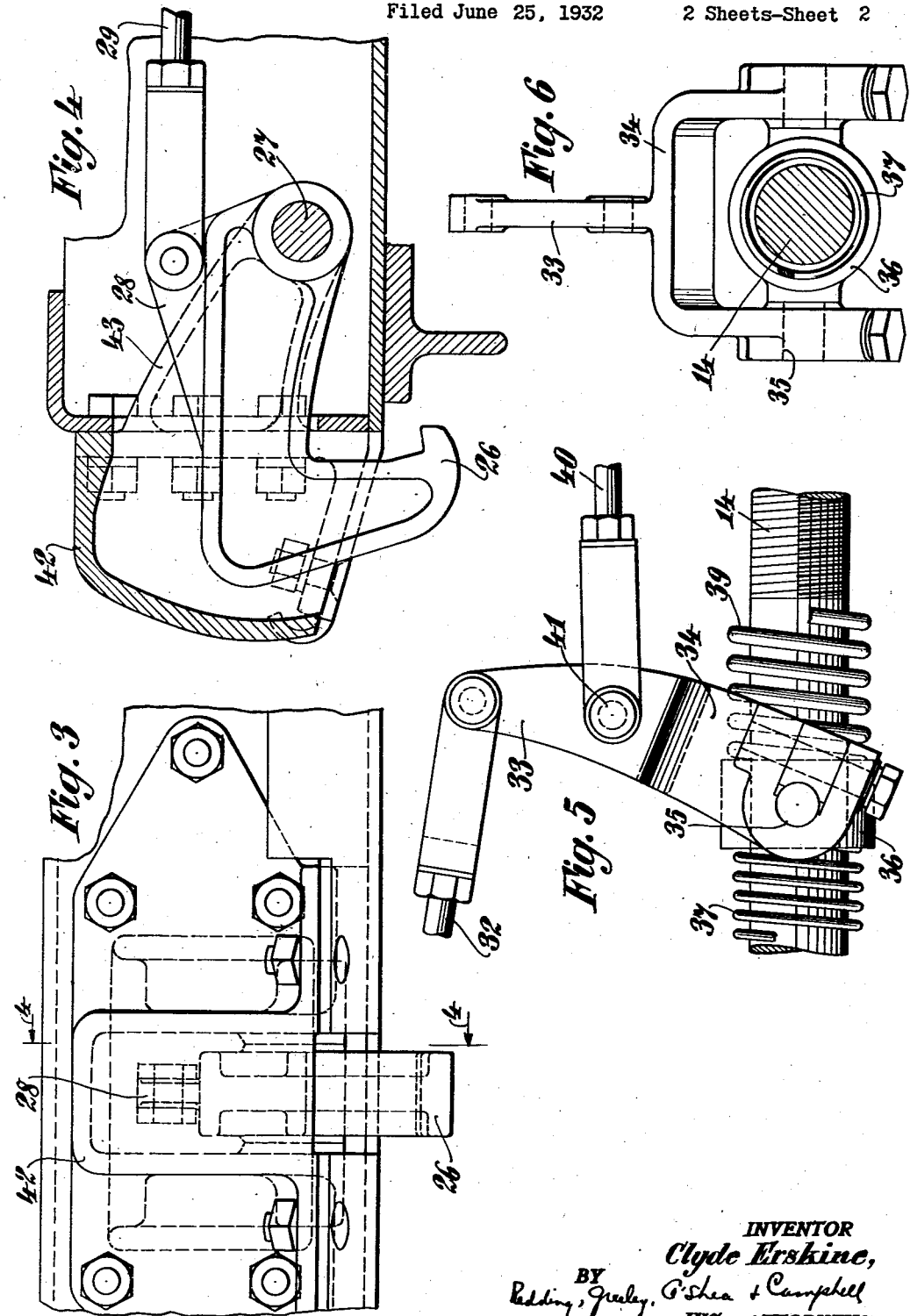
INVENTOR
Clyde Erskine,
BY Redding, Greeley, O'Shea & Campbell
HIS ATTORNEYS Patented Jan. 2, 1934

1,941,669

UNITED STATES PATENT OFFICE 1,941,669

SEMITRAILER

Clyde Erskine, Michigan City, Ind., assignor to International Motor Company, New York, N. Y., a corporation of Delaware Application June 25, 1932. Serial No. 619,245

6 Claims. (Cl. 280—33.1)

The present invention relates to motor vehicles of the semi-trailer type and embodies, more specifically, an improved interlocking and safety mechanism for fifth wheel connections between a tractor and a semi-trailer.

More particularly, the invention embodies a locking and operating mechanism for semi-trailer support wheels whereby the semi-trailer is effectively locked to the fifth wheel connection on the tractor while the support wheels are in a retracted or non-supporting position.

Considerable danger exists in semi-trailer operation from the possibility of disconnecting the fifth wheel connection while the support wheels of the semi-trailer are in a retracted or non-supporting position. These support wheels should always be moved to a supporting position before the semi-trailer is disconnected from the tractor in order that the semi-trailer may be properly supported when the fifth wheel connection is disconnected and thus no longer serves as the supporting medium for the forward end of the semi-trailer. In order that a semi-trailer may be provided which cannot be disconnected from the fifth wheel connection of a tractor without moving the support wheels to a supporting position, the present invention has been designed and an object thereof is to provide a locking mechanism connected in such fashion that the fifth wheel connection between the tractor and semi-trailer is locked in a connected position during the normal operation of the tractor and trailer, at which time the supporting wheels of the semi-trailer are held in a non-supporting position.

A further object of the invention is to provide a locking mechanism for semi-trailers whereby when the support wheels are moved to a supporting position, the locking mechanism is released permitting uncoupling the semi-trailer from the tractor.

Further objects, not specifically enumerated above, will be apparent as the invention is described in greater detail in connection with the accompanying drawings, wherein:

Figure 1 is a view in side elevation showing a portion of a semi-trailer provided with support wheels and a locking mechanism constructed in accordance with the present invention.

Figure 2 is a plan view of the mechanism shown in Figure 1.

Figure 3 is a detail view in end elevation looking from the left in Figures 1 and 2, and showing the locking mechanism of the present invention.

Figure 4 is a view in section, taken on line 4—4 of Figure 3, and looking in the direction of the arrows.

Figure 5 is a detail view of the floating lever construction for actuating the locking mechanism of Figures 1, 2, 3 and 4.

Figure 6 is a view in end elevation showing the mechanism of Figure 5.

With reference to the accompanying drawings, the frame of a semi-trailer is shown at 10 and is provided with a guideway 11 upon which a slidable head 12 is mounted. Head 12 is provided with a threaded nut 13 through which a screw 14 passes, the ends of screw 14 being journaled in brackets 15 upon the frame of the semi-trailer.

A bevel gear 16 is mounted upon one end of screw 14 and engages a driving gear 17 which is secured to a driving shaft 18. Shaft 18 is rotated by a handle 19 or other suitable mechanism and thus causes nut 13 to travel along the length of the screw 14.

Two supporting struts are journaled at 21 one at each side, upon the frame of the semi-trailer and, at their other ends, carry support wheels 22. Links 23 connected to the lower portions of the struts 20 converge and are connected to the head 12 and the supporting wheels 22 are thus moved from the position indicated in solid lines in Figure 1 to the position indicated in dot and dash lines in Figure 1. The fifth wheel connection between a tractor frame 24 and the frame 10, is illustrated in dot and dash lines at the left of Figure 1, this connection being designated by the reference character 25. The fifth wheel mechanism is secured to the tractor frame 24 and, as noted above, it is desirable that the semi-trailer frame be locked to this fifth wheel connection until support wheels have been moved to a supporting position. In order that disconnection of the semi-trailer frame from the tractor may not be accomplished without first moving the support wheels to a supporting position, a lock 26 is provided. This lock is journaled at 27 and is provided with a lug 28 to which a link 29 is connected. The other end of link 29 is pivoted to an arm 30 which is journaled upon the semi-trailer frame at 31. A second link 32 is connected to the arm 30 and is connected to one end of a floating lever 33. The other end of lever 33 is formed with a bifurcated portion 34 within which the trunnions 35 on a sleeve 36 are journaled. Sleeve 36 is slidably mounted upon the screw 14 and spring 37 normally urges the sleeve 36 away from the left hand bracket 15 as viewed in Figures 1 and 2.

A spring 38 is mounted over the shaft 32 and is seated between a collar 33ª secured to link 32 and a bracket 34 which is secured to the semi-trailer frame. The bracket 34 is apertured to receive the link 32 and thus spring 38 normally urges the latch 26 into its locking position. In such position the latch 26 prevents the disconnection of the semi-trailer from the tractor.

As the nut 13 is advanced along the screw 14 to the left, as viewed in Figures 1 and 2, nut 13 engages a spring 39 and causes the sleeve 36 to be moved to the left, as viewed in Figures 1, 2, and 5.

A brake rod 40 is connected to the floating lever 33 at 41 and may serve to actuate a braking mechanism on the semi-trailer as well as providing an anchor for the floating lever 33 to permit the actuation of the latch 26. In actuating the latch the spring 39 overcomes spring 38 and effects the disengagement of the latch at a time when the supporting wheel 22 reaches a supporting position as illustrated in dot and dash lines in Figure 1.

The latch 26 may be protected by a housing 42, which also acts as a stop for latch 26, as illustrated in Figures 1, 3, and 4 and the housing may be provided with rearwardly extending arms 43 to provide a pivot support 27 for the latch 26.

It will thus be seen that the foregoing mechanism provides a construction wherein a lock is provided to prevent the disengagement of a semi-trailer from a tractor without first moving the support wheels to a supporting position.

While the invention has been described with specific reference to the accompanying drawings, it is not to be limited, save as defined in the appended claims.

I claim as my invention:

1. A semi-trailer having a supporting wheel, a threaded shaft journaled on the semi-trailer, means to turn the shaft, a nut on the shaft connected to the wheel to effect the movement thereof, a lock on the semi-trailer to secure the same to a tractor, means to urge the lock into locking position, and means operated by the threaded shaft to actuate the lock.

2. A semi-trailer having a supporting wheel, a threaded shaft journaled on the semi-trailer, means to turn the shaft, a nut on the shaft connected to the wheel to effect the movement thereof, a lock on the semi-trailer to secure the same to a tractor, a sleeve slidably mounted on the shaft to be engaged by the nut, and means to actuate the lock by the sleeve.

3. A semi-trailer having a supporting wheel, a threaded shaft journaled on the semi-trailer, means to turn the shaft, a nut on the shaft connected to the wheel to effect the movement thereof, a lock on the semi-trailer to secure the same to a tractor, a sleeve slidably mounted on the shaft to be engaged by the nut, a lever pivoted on the sleeve, a link connecting the lever to the lock, and an anchor means for the lever.

4. A semi-trailer having a supporting wheel, a threaded shaft journaled on the semi-trailer, means to turn the shaft, a nut on the shaft connected to the wheel to effect the movement thereof, a lock on the semi-trailer to secure the same to a tractor, a sleeve slidably mounted on the shaft to be engaged by the nut, a lever pivoted on the sleeve, a link connecting the lever to the lock, and a brake rod connected to the lever.

5. A semi-trailer having a supporting wheel, a threaded shaft journaled on the semi-trailer, means to turn the shaft, a nut on the shaft connected to the wheel to effect the movement thereof, a lock on the semi-trailer to secure the same to a tractor, a sleeve slidably mounted on the shaft to be engaged by the nut, a lever pivoted on the sleeve, a link connecting the lever to the lock, a spring to urge the last named link and lock into locking position, an anchor means for the lever, and a spring on the shaft between the sleeve and nut.

6. A semi-trailer having supporting wheels, a threaded shaft journaled on the semi-trailer, means to turn the shaft, a nut on the shaft connected to the wheel to effect the movement thereof, a lock on the semi-trailer to secure the same to a tractor, a sleeve slidably mounted on the shaft to be engaged by the nut, a lever pivoted on the sleeve, a link connecting the lever to the lock, a spring to urge the last named link and lock into locking position, an anchor means for the lever, and springs on the shaft upon opposite sides of the sleeve.

CLYDE ERSKINE.